United States Patent
Lee

(10) Patent No.: US 12,045,402 B2
(45) Date of Patent: Jul. 23, 2024

(54) INPUT MODULE, MOUSE AND KEYBOARD USING THE SAME

(71) Applicant: LITE-ON TECHNOLOGY CORPORATION, Taipei (TW)

(72) Inventor: Chien-I Lee, Taipei (TW)

(73) Assignee: LITE-ON TECHNOLOGY CORPORATION, Taipei (TW)

(*) Notice: Subject to any disclaimer, the term of this patent is extended or adjusted under 35 U.S.C. 154(b) by 0 days.

(21) Appl. No.: 17/859,931

(22) Filed: Jul. 7, 2022

(65) Prior Publication Data
US 2023/0008309 A1 Jan. 12, 2023

Related U.S. Application Data

(60) Provisional application No. 63/219,393, filed on Jul. 8, 2021.

(30) Foreign Application Priority Data

Jun. 24, 2022 (CN) .......................... 202210730055.2

(51) Int. Cl.
*G06F 3/0362* (2013.01)
*G06F 3/02* (2006.01)
*G06F 3/03* (2006.01)
*G06F 3/0354* (2013.01)

(52) U.S. Cl.
CPC ............ *G06F 3/0362* (2013.01); *G06F 3/021* (2013.01); *G06F 3/0304* (2013.01); *G06F 3/03543* (2013.01)

(58) Field of Classification Search
CPC ...... G06F 3/0362; G06F 3/021; G06F 3/0304; G06F 3/03543
See application file for complete search history.

(56) References Cited

U.S. PATENT DOCUMENTS

| | | | | |
|---|---|---|---|---|
| 5,841,428 A | * | 11/1998 | Jaeger | G02F 1/13306 345/184 |
| 6,011,543 A | * | 1/2000 | Tian | G06F 3/03543 345/157 |
| 6,563,490 B1 | * | 5/2003 | Wang | G06F 3/0354 345/166 |
| 10,990,195 B2 | * | 4/2021 | Chung | E05B 37/00 |
| 11,243,049 B1 | * | 2/2022 | Enzinger | G02B 27/36 |
| 2004/0012915 A1 | * | 1/2004 | Hsu | H05K 5/00 361/679.09 |
| 2006/0012584 A1 | * | 1/2006 | Vassallo | G06F 3/016 345/184 |
| 2007/0114114 A1 | * | 5/2007 | Park | H01H 25/041 200/4 |
| 2008/0047815 A1 | * | 2/2008 | Montalvo | H01H 25/041 200/5 R |

(Continued)

*Primary Examiner* — Ariel A Balaoing
(74) *Attorney, Agent, or Firm* — Innovation Counsel LLP

(57) ABSTRACT

An input module includes a knob, a first circuit board, an optical transmitter and an optical receiver. The knob has a peripheral surface. The optical transmitter is disposed on the first circuit board and faces the peripheral surface, wherein the optical transmitter is configured to emit a detecting light to the peripheral surface. The optical receiver is disposed on the first circuit board and configured to receive a reflected light of the detecting light reflected from the peripheral surface.

19 Claims, 7 Drawing Sheets

(56) References Cited

U.S. PATENT DOCUMENTS

| | | | | |
|---|---|---|---|---|
| 2010/0175974 | A1* | 7/2010 | Huang | H01H 25/041 |
| | | | | 200/344 |
| 2011/0240836 | A1* | 10/2011 | Phan Le | G06F 3/0362 |
| | | | | 250/230 |
| 2012/0081284 | A1* | 4/2012 | Wu | G06F 3/0362 |
| | | | | 345/163 |
| 2017/0299412 | A1* | 10/2017 | Tseng | G01D 5/3473 |
| 2020/0174512 | A1* | 6/2020 | Battlogg | G05G 5/03 |
| 2022/0261044 | A1* | 8/2022 | Chen | G06F 3/0362 |

* cited by examiner

INPUT MODULE, MOUSE AND KEYBOARD USING THE SAME

This application claims the benefit of U.S. provisional application Ser. No. 63/219,393, filed Jul. 8, 2021, the subject matter of which is incorporated herein by reference, and this application claims the benefit of People's Republic of China application Serial No. 202210730055.2, filed on Jun. 24, 2022, the subject matter of which is incorporated herein by reference.

TECHNICAL FIELD

The disclosure relates in general to an input module, a mouse and a keyboard using the same.

BACKGROUND

Conventional input module of an electronic device is mostly a keyboard. However, the keyboard includes some mechanical key structures which occupy a large volume, accepts only push-type operation (if rotating operation is required, an additional electronic mouse is required), and such input module limits its applications. Therefore, it is the goal for those skilled in the art to propose a new input module for improving the aforementioned problem.

SUMMARY

According to an embodiment, an input module is provided. The input module includes a knob, a first circuit board, an optical transmitter and an optical receiver. The knob has a peripheral surface. The optical transmitter is disposed on the first circuit board and faces the peripheral surface, wherein the optical transmitter is configured to emit a detecting light to the peripheral surface. The optical receiver is disposed on the first circuit board and configured to receive a reflected light of the detecting light reflected from the peripheral surface.

According to another embodiment, an electronic device is provided. The electronic device includes a housing and an input module. The input module is disposed in the housing. The input module includes a knob, a first circuit board, an optical transmitter and an optical receiver. The knob has a peripheral surface. The optical transmitter is disposed on the first circuit board and faces the peripheral surface, wherein the optical transmitter is configured to emit a detecting light to the peripheral surface. The optical receiver is disposed on the first circuit board and configured to receive a reflected light of the detecting light reflected from the peripheral surface.

According to another embodiment, a mouse is provided. The mouse includes a housing, a scroll wheel and an input module. The input module is disposed in the housing and protruding relative to the housing. The scroll wheel is disposed on the housing and protrudes upward relative to the housing. The input module includes a knob, a first circuit board, an optical transmitter and an optical receiver. The knob has a peripheral surface. The optical transmitter is disposed on the first circuit board and faces the peripheral surface, wherein the optical transmitter is configured to emit a detecting light to the peripheral surface. The optical receiver is disposed on the first circuit board and configured to receive a reflected light of the detecting light reflected from the peripheral surface.

According to another embodiment, a mouse is provided. The mouse includes a housing and an input module. The input module is disposed on the housing and protrudes relative to the housing. The input module includes a knob, a first circuit board, an optical transmitter and an optical receiver. The knob has a peripheral surface. The optical transmitter is disposed on the first circuit board and faces the peripheral surface, wherein the optical transmitter is configured to emit a detecting light to the peripheral surface. The optical receiver is disposed on the first circuit board and configured to receive a reflected light of the detecting light reflected from the peripheral surface.

According to another embodiment, a keyboard is provided. The keyboard includes a housing and an input module. The input module is disposed on the housing and protrudes relative to the housing. The input module includes a knob, a first circuit board, an optical transmitter and an optical receiver. The knob has a peripheral surface. The optical transmitter is disposed on the first circuit board and faces the peripheral surface, wherein the optical transmitter is configured to emit a detecting light to the peripheral surface. The optical receiver is disposed on the first circuit board and configured to receive a reflected light of the detecting light reflected from the peripheral surface.

The above and other aspects of the disclosure will become better understood with regard to the following detailed description of the preferred but non-limiting embodiment (s). The following description is made with reference to the accompanying drawings.

Figure 1:
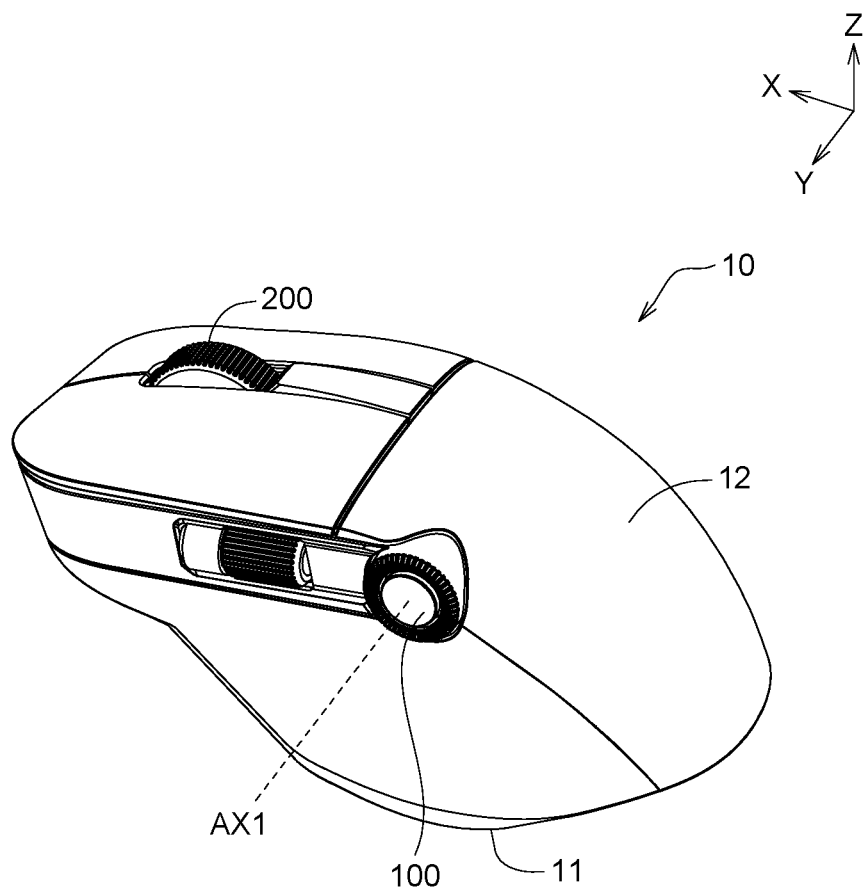
FIG. 1 is an external schematic diagram of an electronic device according to an embodiment of the present invention.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Figure 2:
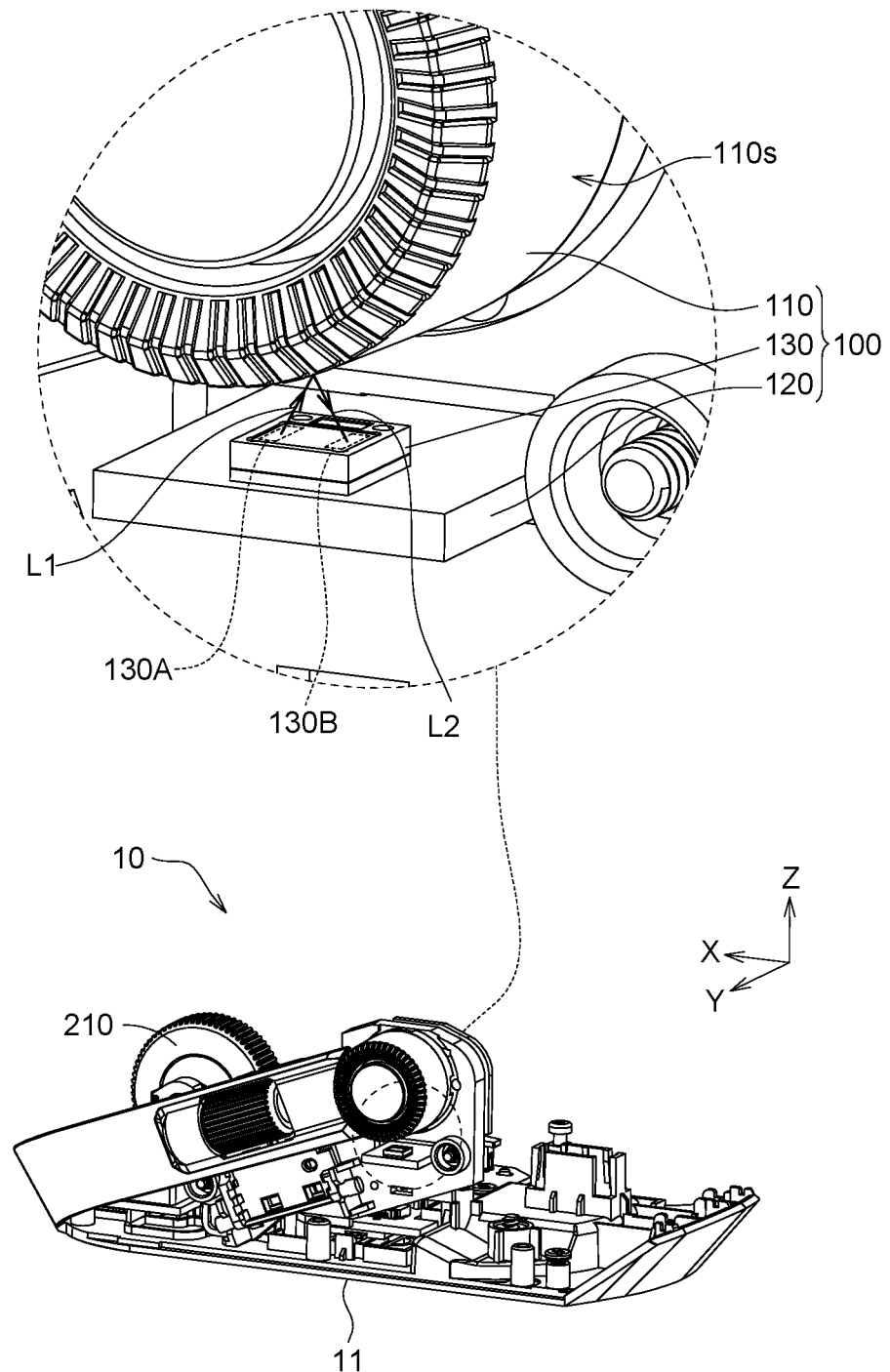
FIG. 2 is an internal schematic diagram of the electronic device of FIG. 1.

Referring to FIGS. 1 to 2, FIG. 1 is an external schematic diagram of an electronic device 10 according to an embodiment of the present invention, and FIG. 2 is an internal schematic diagram of the electronic device 10 of FIG. 1 (an second case 12 is not shown).

As shown in FIG. 1, the electronic device 10 of the embodiment of the present invention is a mouse, for example; however, such exemplification is not meant to be for limiting. In another embodiment, the electronic device 10 could be any product that requires input instruction, such as a keyboard, a home appliance, a vehicle, etc.

As shown in FIG. 1, the electronic device 10 includes a housing (at least including a first case 11 and the second case 12) and at least one input module 100. The first case 11 is, for example, a bottom case or a lower case of the housing, and the second case 12 is, for example, an upper case or a top case of the housing. The second case 12 is butted with the first case 11 for protecting the elements located between the second case 12 and the first case 11. The input module 100 is disposed on the housing, protrudes relative to the housing and is exposed laterally. For example, the input module 100 is disposed on the first case 11 and protrudes relative to an upper surface of the second case 12 and is exposed from a lateral surface of the first case 11 for facilitating the user's operation.

As shown in FIG. 2, the input module 100 includes a knob 110, a first circuit board 120, an optical transmitter 130A and an optical receiver 130B. The knob 110 has a peripheral surface 110s. The optical transmitter 130A is disposed on the first circuit board 120 and faces (e.g., right faces) the peripheral surface 110s, and the optical transmitter 130A could emit a detecting light L1 to the peripheral surface 110s. The optical receiver 130B is disposed on the first circuit board 120 and is configured for receiving a reflected light L2 of the detecting light L1 which is reflected from the peripheral surface 110s. The electronic device 10 of the embodiment of the present invention includes an optical input module 100 which provides a rotary input operation (through the knob 110), thereby increasing the input application of the electronic device 10. In addition, a processor (not shown) could analyze signal of the detecting light L1 and signal of the reflected light L2 to obtain the rotation direction and/or rotation amount of the knob 110.

In the present embodiment, the optical transmitter 130A and the optical receiver 130B could be integrated into an optical sensing module 130, and the optical sensing module is, for example, an Optical Tracking Sensor (OTS). In another embodiment, the optical transmitter 130A and the optical receiver 130B could be two separate components (not integrated into single piece). In addition, the number of the optical transmitter 130A and/or the number of the optical receiver 130B could be one or multiple.

In addition, the XY plane of FIG. 2 is, for example, parallel to the bottom surface of the first case 11, and the X, Y and Z axes are perpendicular to each other. The direction of the optical axis of the detecting light L1 emitted by the optical transmitter 130A could be parallel to the Z axis, or includes an acute angle relative to the Z axis. The knob 110 could rotate around a central axis AX1m wherein the central axis AX1 is, for example, parallel to the Y axis, or includes an acute angle or an obtuse angle relative to the Y axis. In other embodiments, the input module 100 could be disposed in a way of the central axis AX1 of the knob 110 being parallel to the X axis or the Z axis.

As shown in FIGS. 1 and 2, in addition to the input module 100, the electronic device 10 could further include at least one input module 200. The input module 200 is disposed on the housing and protrudes relative to the upper surface of the housing. For example, the input module 200 is exposed from and protruded relative to the upper surface of the second case 12 for facilitating the user's operation. The input module 200 includes a scroll wheel 210 and an encoder (not shown). The scroll wheel 210 includes a rotating shaft passing through the encoder, and the encoder could detect the rotation direction (clockwise or counterclockwise), the rotation amount and the rotation speed of the scroll wheel 210. The rotation direction of the scroll wheel 210 of the input module 200 and the rotation direction of the knob 110 of the input module 100 could be the same or different. In the present embodiment, the scroll wheel 210 could rotate around a rotational axis (not shown), wherein the rotational axis is, for example, parallel to the Y axis and/or the wheel surface of the scroll wheel 210 could be pressed. In another embodiment, the electronic device 10 could omit the input module 200, and the input module 100 could be disposed on the position of the input module 200 of FIG. 1, or disposed on other suitable position of the housing.

Figure 3A:
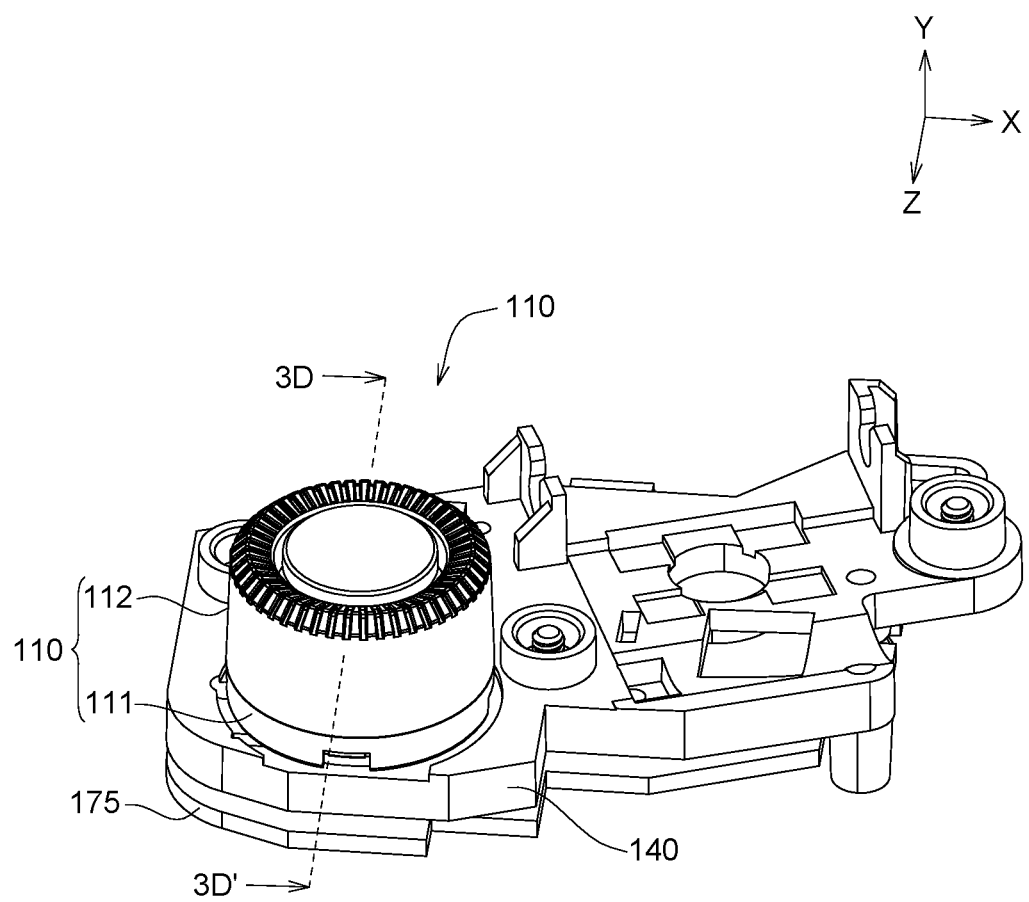
FIG. 3A is an external schematic diagram of the input module of FIG. 1.
Figure 3B:
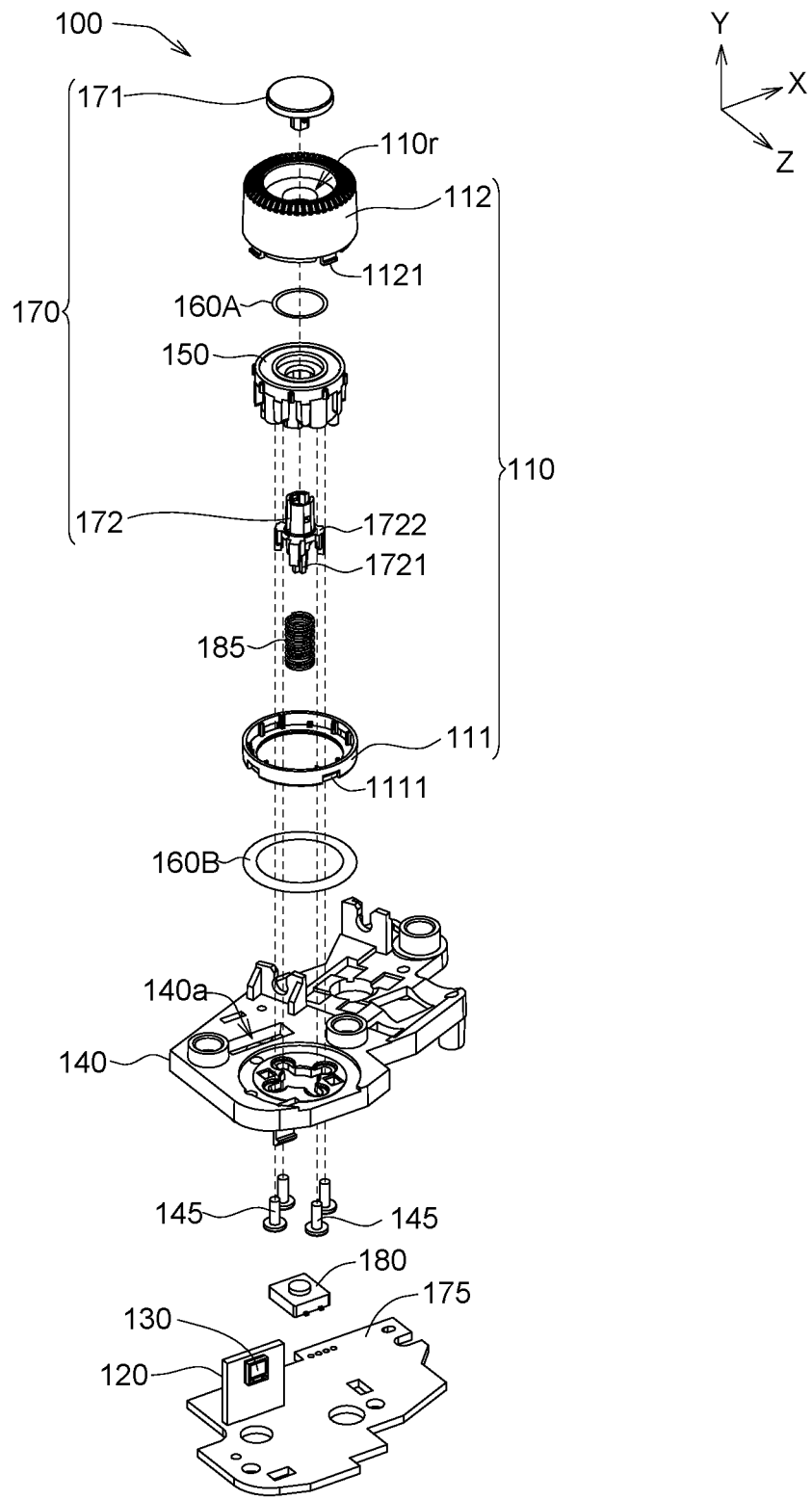
FIGS. 3B and 3C are exploded schematic diagrams of the input module of FIG. 3A viewed in different viewing angles.
Figure 3C:
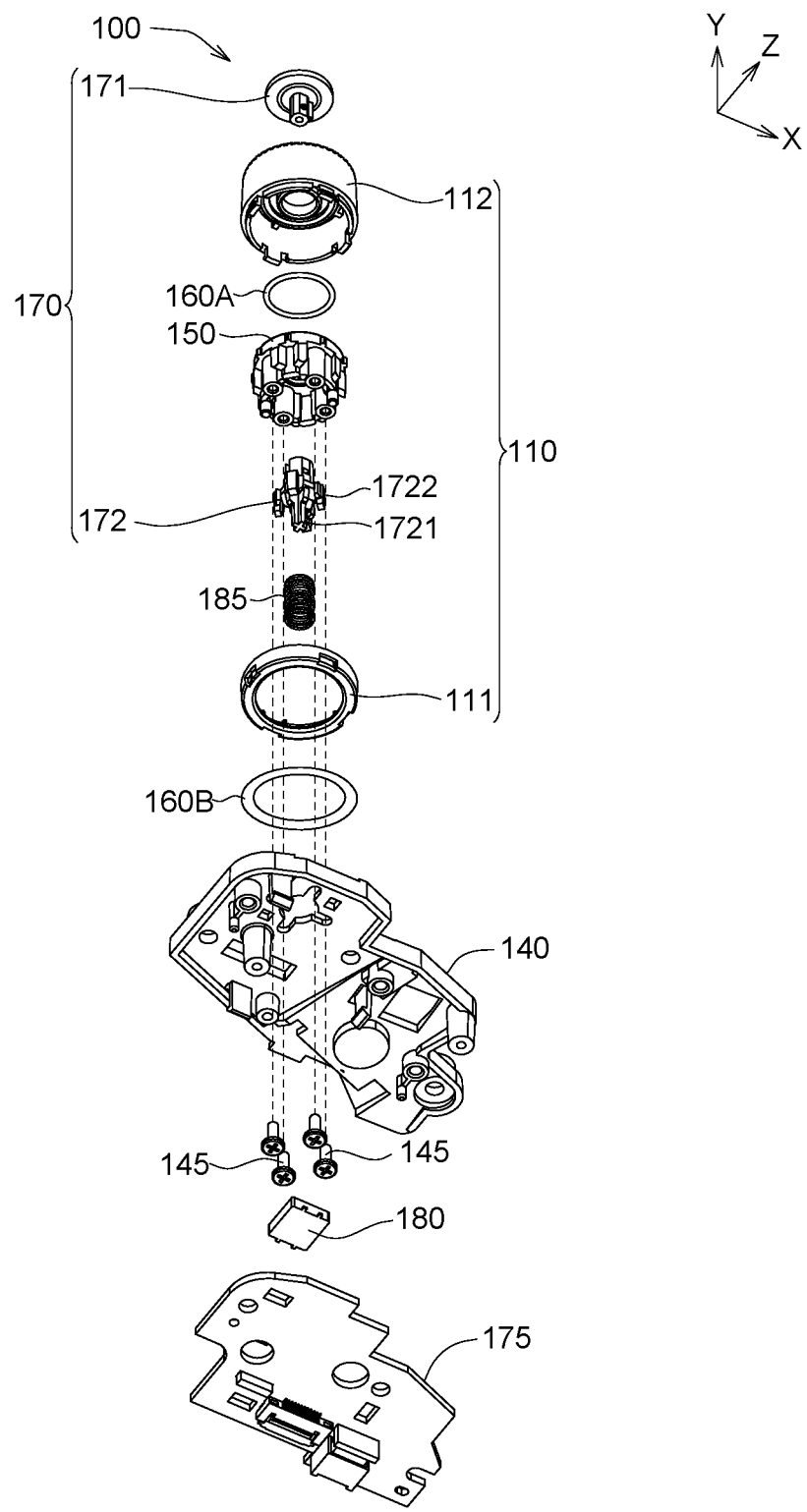
Figure 3D:
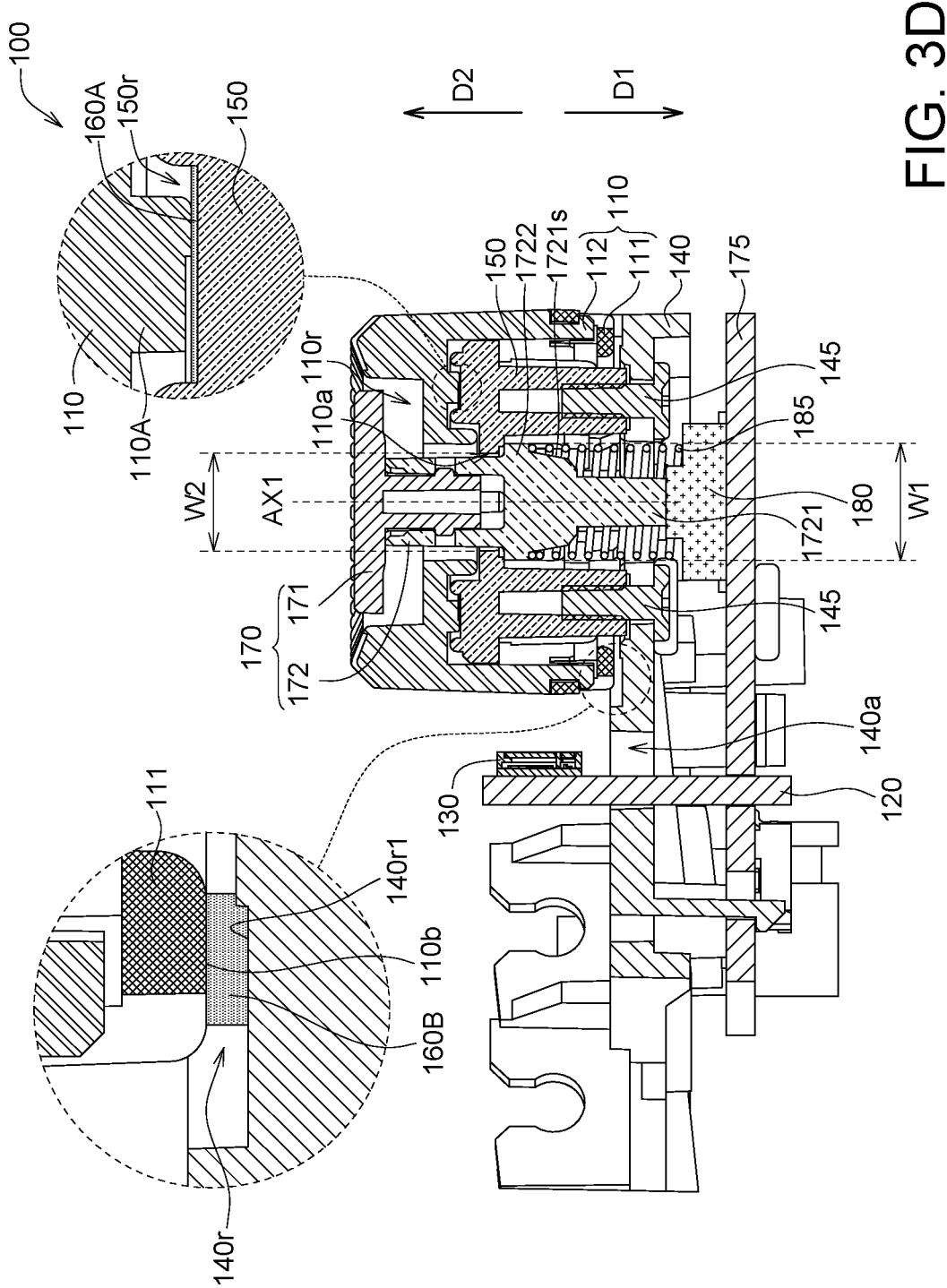
FIG. 3D is a schematic diagram of a cross-sectional view of the input module of 3A along a direction 3D-3D'.

Referring to FIGS. 3A to 3D, FIG. 3A is an external schematic diagram of the input module 100 of FIG. 1, FIGS. 3B and 3C are exploded schematic diagrams of the input module 100 of FIG. 3A viewed in different viewing angles, and FIG. 3D is a schematic diagram of a cross-sectional view of the input module 100 of 3A along a direction 3D-3D'.

As shown in FIGS. 3B and 3D, the input module 100 further includes a base 140, a holder 150, a first intermediate layer 160A and a second intermediate layer 160B. The base 140 could be fixed to the first case 11 (the first case 11 is shown in FIG. 2). The holder 150 is connected to the base 140. For example, the input module 100 further includes a number of fixing members 145. The fixing members 145 pass through the base 140 to be fixed to the holder 150 for fixing the relative position between the base 140 and the holder 150. In an embodiment, the fixing member 145 is, for example, an element having male thread, and the holder 150 is, for example, an element having screw holes matched with the male thread. In another embodiment, the fixing member 145 and the holder 150 could be combined through a technique such as engaging, bonding, etc.

As shown in FIGS. 3B and 3D, the base 140 has a through hole 140a, and the first circuit board 120 could pass through the through hole 140a to extend to a position corresponding to the knob 110. As a result, the optical sensing module disposed on the first circuit board 120 could right face the peripheral surface 110s of the knob 110.

As shown in FIGS. 3B and 3D, the knob 110 surrounds the holder 150 and is rotatably disposed relative to the holder 150. The first intermediate layer 160A is disposed between the holder 150 and the knob 110 for reducing the rotational resistance between the holder 150 and the knob 110. The knob 110 includes a convex portion 110A, and the holder 150 includes a groove 150r. The convex portion 110A is combined with the groove 150r to guide the relative rotation between the holder 150 and the knob 110. In addition, the first intermediate layer 160A could be disposed in the groove 150r to restrict the displacement amount of the first intermediate layer 160A. The first intermediate layer 160A is disposed between the convex portion 110A and the groove 150r, wherein the convex portion 110A contacts the first intermediate layer 160A for reducing the rotational resistance. In addition, the first intermediate layer 160A is, for example, a lubricating layer, which could be made of a liquid material or a solid material, wherein the liquid material is, for example, lubricating oil, and the solid material is, for example, a solid material with a low friction coefficient, such as graphite, wherein the graphite could be various geometric forms such as flake shape, pad shape, plate shape, block shape and/or granule shape could be realized.

As shown in FIGS. 3B and 3D, the second intermediate layer 160B could be disposed between the knob 110 and the base 140 to reduce the rotational resistance between the knob 110 and the base 140. The base 140 has a groove 140r, the knob 110 has a bottom surface 110b, and the second intermediate layer 160B is disposed in the groove 140r and between the bottom surface 110b and a groove bottom surface 140r1 of the groove 140r. The bottom surface 110b contacts the second intermediate layer 160B for reducing the rotational resistance of the knob 110 and the base 140. The bottom surface 110b provides a large area to be in contact with the second intermediate layer 160B, and accordingly it produces an excellent lubricating effect. The material and/or geometry of the second intermediate layer 160B could be similar or the same as that of the first intermediate layer 160A, and details are not repeated herein again. In addition, in another embodiment, depending on requirements, the input module 100 could also omit at least one of the first intermediate layer 160A and the second intermediate layer 160B.

As shown in FIGS. 3B and 3D, the knob 110 includes a knob chassis 111 and a knob appearance member 112. The knob chassis 111 has the aforementioned bottom surface 110b, and the knob appearance member 112 has the aforementioned peripheral surface 110s. The knob chassis 111 is connected with the knob appearance member 112, for example, the knob chassis 111 is engaged with the knob appearance member 112. Furthermore, the knob chassis 111 includes at least one first engaging portion 1111, and the knob appearance member 112 includes at least one second engaging portion 1121, wherein the first engaging portion 1111 and the second engaging portion 1121 could be engaged with each other for fixing the relative position between the knob chassis 111 and the knob appearance member 112. In the present embodiment, the first engaging portion 1111 is, for example, a concave portion (e.g., a through hole), and the second engaging portion 1121 is, for example, a convex portion. In another embodiment, the first engaging portion 1111 could be a convex portion, and the second engaging portion 1121 could be a concave portion. The knob chassis 111 and the knob appearance member 112 could be fabricated separately and then combined together by engaging. As a result, the overall manufacturability of the knob 110 could be increased. Furthermore, due to the knob chassis 111 and the twist exterior part 112 being two separate parts, the assembly of the holder 150 could be improved. For example, the holder 150 could be disposed on the knob appearance member 112 first, and then the knob appearance member 112 and the knob chassis 111 are combined with each other. As a result, such assembly process is simple and quick.

To sum up, the knob 110 of the input module 100 could provide a rotary input, and could further provide a push-type input, which will be further exemplified below.

As shown in FIGS. 3B and 3D, the input module 100 further includes a button 170, a second circuit board 175, a switch 180 and an elastic member 185. The button 170 could provide user with a push operation. The button 170 disposed through the knob 110. The switch 180 is disposed on the second circuit board 175 and faces the button 170. As a result, when the button 170 translates along a triggering direction D1 (for example, toward the switch 180) until triggering the switch 180, a trigger signal (not shown) is transmitted to the processor (not shown) through the second circuit board 175, and the processor executes the corresponding function. In addition, the triggering direction D1 is, for example, parallel to the Y-axis (the Y-axis is shown in FIG. 2), or also includes an acute angle or an obtuse angle relative to the Y-axis.

As shown in FIGS. 3B and 3D, the button 170 includes a button appearance member 171 and a trigger member 172, and the relative position between the button appearance member 171 and the trigger member 172 is fixed. For example, the button appearance member 171 and the trigger member 172 could be fixed by engaging. The button appearance member 171 is exposed from the housing (as shown in FIG. 1), for example, the button appearance member 171 could be completely exposed from the first case 11 and/or the second case 12 (as shown in FIG. 1) for facilitating the pressing by the user. The knob 110 has an accommodating groove 110r. The button appearance member 171 could be disposed in the accommodating groove 110r, for example, embedded in the accommodating groove 110r. As a result, the top surface of the button appearance member 171 is substantially aligned or inwardly recessed relative to the top surface of the knob 110, and accordingly it prevents the button appearance member 171 from protruding relative to the top surface of the knob 110. Alternatively, the top surface of the button appearance member 171 could also protrude relative to the top surface of the knob 110. In addition, the structure of the button appearance member 171 is not limited by the embodiments of the present invention, and could also be other suitable structures. In addition, the button 170 could be integrated in the knob 110, for example, the button 170 could be disposed inside the knob 110, and accordingly it could avoid increasing the volume of the input module 100. Furthermore, the knob 110 has a through hole 110a, the through hole 110a penetrates through the knob 110 in the central axis AX1 of the knob 110, and the button 170 passes through the through hole 110a. The trigger member 172 is connected to the button appearance member 171 and includes a trigger portion 1721. The trigger portion 1721 faces (e.g., right faces) the switch 180, so that the trigger portion 1721 could contact (trigger) the switch 180 when the trigger portion 1721 translates in the triggering direction D1. Furthermore, the central axis AX1 is, for example, parallel to the Y axis.

As shown in FIGS. 3B and 3D, the second circuit board 175 is connected to the first circuit board 120. For example, the second circuit board 175 is vertically connected to the first circuit board 120.

As shown in FIGS. 3B and 3D, the elastic member 185 is disposed between the second circuit board 175 and the trigger member 172. The elastic member 185 is, for example, a spring, such as a compression spring, or the elastic member 185 could also be an element that could provide elastic restoring force, such as an elastic sheet. The trigger member 172 of the button 170 penetrates through the aforementioned through hole 110a. The trigger member 172 further includes a flange 1722, wherein the flange 1722 protrudes relative to a peripheral surface 1721s of the trigger portion 1721. The flange 1722 is located between the holder 150 and the second circuit board 175. The flange 1722 has an outer diameter W1 larger than an inner diameter W2 of the through hole 110a. As a result, it could prevent from the button 170 being detached from the knob 110. For example, it could prevent from the button 170 being detached from the knob 110 in a release direction D2. The release direction D2 is the direction from the switch 180 toward the button 110, that is, the release direction D2 is opposite to the triggering direction D1.

Figure 4:
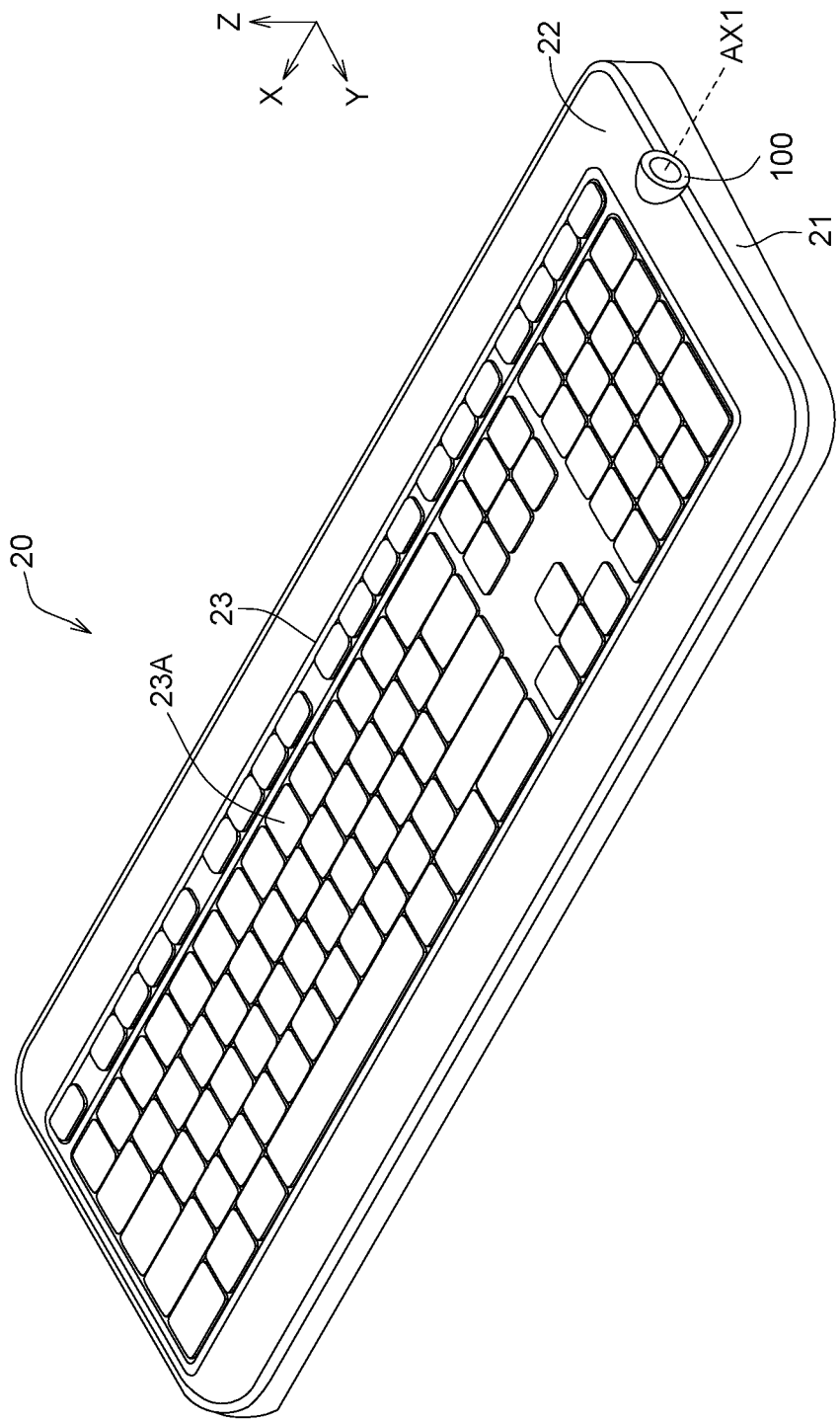
FIG. 4 is a schematic diagram of an electronic device according to another embodiment of the present invention.

Referring to FIG. 4, FIG. 4 is a schematic diagram of an electronic device 20 according to another embodiment of the present invention. The electronic device 20 of the present embodiment is, for example, a keyboard. The electronic device 20 includes a housing (including at least a first case 21 and a second case 22), at least one input module 100 and an input module 23. The first case 21 is connected with the second case 22 for protecting the elements located between the first case 21 and the second case 22. The input module 23 is disposed on the second case 22 and protrudes relative to an upper surface of the second case 22 and is exposed from a lateral surface of the first case 21 to facilitate the user's operation. In another embodiment, the input module 100 could protrude relative to only an upper surface of the housing or relative to only a lateral surface of the housing. In addition, the input module 100 could be disposed in an orientation in which the central axis AX1 of the knob 110 (not shown in FIG. 4) is parallel to the X axis, the Y axis or the Z axis. The input module 23 includes, for example, at least one key 23A. The key 23A includes, for example, a keycap, a lifting mechanism, an elastic body, a baseplate, a membrane switch layer, etc. The lifting mechanism is disposed between the keycap and the baseplate and pivotally connects the keycap with the baseplate. The elastic body is disposed between the keycap and the membrane switch layer. When the key 23A is in a pressed state, the elastic body deforms to trigger a switch of the membrane switch layer. When the key 23A is in a released state, the elastic body returns to an initial state and drives the keycap to reset.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. An input module, comprising:
   a knob having a rotation axis and a peripheral surface surrounding the rotation axis;
   a first circuit board;
   an optical transmitter disposed on the first circuit board and facing the peripheral surface, wherein the optical transmitter is configured to emit a detecting light to the peripheral surface; and
   an optical receiver disposed on the first circuit board and configured to receive a reflected light of the detecting light reflected from the peripheral surface;
   wherein the rotation axis is substantially perpendicular to a normal line of a transmitting surface of the optical transmitter;
   wherein the optical transmitter and the optical receiver are on the same side of the peripheral surface, or the first circuit board is outside the knob in its entirety.

2. The input module as claimed in claim 1, further comprising:
   a holder;
   wherein the knob surrounds the holder and is rotatably disposed relative to the holder.

3. The input module as claimed in claim 2, further comprising:
   a first intermediate layer disposed between a fixed seat and the knob.

4. The input module as claimed in claim 1, wherein the knob comprises:
   a knob chassis comprising a first engaging portion;
   a knob appearance member having the peripheral surface and a second engaging portion;
   wherein the first engaging portion is engaged with the second engaging portion.

5. The input module as claimed in claim 1, wherein the knob has a bottom surface, and the input module further comprises:
   a base having a groove; and
   a second intermediate layer disposed in the groove and between the bottom surface and a groove bottom surface of the groove.

6. The input module of claim 1, further comprises a holder comprising a groove, the knob surrounds the holder and comprises a convex portion, and the convex portion is combined with the groove.

7. The input module as claimed in claim 6, further comprising:
   a first intermediate layer disposed between the convex portion and the groove.

8. The input module as claimed in claim 1, further comprising:
   a button disposed through the knob;
   a second circuit board; and
   a switch disposed on the second circuit board and facing the button.

9. The input module as claimed in claim 8, wherein the button comprises:
   a button appearance member; and
   a trigger member connected with the button appearance member and comprising a trigger portion, wherein the trigger portion faces the switch.

10. The input module of claim 8, wherein the input module further comprises:
    an elastic member disposed between the second circuit board and the button.

11. The input module as claimed in claim 8, wherein the knob has a through hole, and a trigger member of the button comprises:
    a triggering portion disposed through the through hole; and
    a flange protruding relative to a peripheral surface of the triggering portion;
    wherein the flange has an outer diameter larger than an inner diameter of the through hole.

12. The input module as claimed in claim 8, wherein the knob has an accommodating groove, the button comprises a button appearance member, and the button appearance member is embedded in the accommodating groove.

13. The input module as claimed in claim 8, wherein the knob has a through hole, the through hole penetrates the knob in a central axis of the knob, and the button disposed through the through hole.

14. The input module as claimed in claim 8, wherein the knob comprises a holder, the button comprises a flange, and the flange is located between the holder and the second circuit board for limiting the button being detached from the knob in a release direction from the switch to the button.

15. The input module as claimed in claim 14, further comprising:
    an elastic member disposed between the second circuit board and the flange.

16. A mouse, comprising:
    a housing comprising a first case and a second case butted with the first case, wherein the second case has a hole;
    an input module disposed in the housing, exposed from the hole, and protruding relative to the housing, wherein the input module comprises:
       a knob having a rotation axis and a peripheral surface surrounding the rotation axis;
       a first circuit board;
       an optical transmitter disposed on the first circuit board and facing the peripheral surface, wherein the optical transmitter is configured to emit a detecting light to the peripheral surface; and
       an optical receiver disposed on the first circuit board and configured to receive a reflected light of the detecting light reflected from the peripheral surface.

17. The mouse as claimed in claim 16, further comprising:
a scroll wheel disposed on the housing and protruding upward relative to the housing.

18. A keyboard, comprising:
a housing comprising a first case and a second case butted with the first case, wherein the second case has a hole; and
an input module, disposed on the housing, exposed from the hole, and protruding relative to the housing, wherein the input module comprises:
   a knob having a rotation axis and a peripheral surface surrounding around the rotation axis;
   a first circuit board;
   an optical transmitter disposed on the first circuit board and facing the peripheral surface, wherein the optical transmitter is configured to emit a detecting light to the peripheral surface; and
an optical receiver disposed on the first circuit board and configured to receive a reflected light of the detecting light reflected from the peripheral surface.

19. The input module as claimed in claim 1, wherein the rotation axis is parallel to a horizontal axis.

\* \* \* \* \*